US008778156B2

(12) United States Patent
Eisaman et al.

(10) Patent No.: US 8,778,156 B2
(45) Date of Patent: Jul. 15, 2014

(54) ELECTRODIALYTIC SEPARATION OF GAS FROM AQUEOUS CARBONATE AND BICARBONATE SOLUTIONS

(75) Inventors: Matthew D. Eisaman, Redwood City, CA (US); Karl A. Littau, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 545 days.

(21) Appl. No.: 12/969,485

(22) Filed: Dec. 15, 2010

(65) Prior Publication Data

US 2012/0152744 A1 Jun. 21, 2012

(51) Int. Cl.
*B01D 61/46* (2006.01)

(52) U.S. Cl.
USPC ........... 204/528; 204/529; 204/531; 204/534; 204/537; 204/631

(58) Field of Classification Search
USPC .......... 204/528, 529, 531, 534, 537, 538, 631
See application file for complete search history.

(56) References Cited

U.S. PATENT DOCUMENTS

| | | | |
|---|---|---|---|
| 3,878,086 A | | 4/1975 | Haswell et al. |
| 3,933,617 A | | 1/1976 | Yamamoto et al. |
| 4,536,269 A | * | 8/1985 | Chlanda et al. ............... 204/535 |
| 4,584,077 A | | 4/1986 | Chlanda et al. |
| 4,592,817 A | | 6/1986 | Chlanda et al. |
| 4,636,289 A | | 1/1987 | Mani et al. |
| 2004/0060823 A1 | | 4/2004 | Carson et al. |
| 2006/0051274 A1 | | 3/2006 | Wright et al. |
| 2007/0169625 A1 | | 7/2007 | Aines et al. |
| 2007/0187247 A1 | | 8/2007 | Lackner et al. |
| 2008/0031801 A1 | | 2/2008 | Lackner et al. |
| 2008/0087165 A1 | | 4/2008 | Wright et al. |
| 2009/0159456 A1 | | 6/2009 | Littau |
| 2009/0233155 A1 | | 9/2009 | Littau |
| 2009/0294366 A1 | | 12/2009 | Wright et al. |
| 2009/0301297 A1 | | 12/2009 | Littau |
| 2010/0005959 A1 | | 1/2010 | Littau et al. |
| 2010/0059377 A1 | | 3/2010 | Littau et al. |

OTHER PUBLICATIONS

M.D. Eisaman, D.E. Schwartz, S. Amic, D. Larner, J. Zesch, F. Torres and K. Littau, Energy-efficient electrochemical CO2 capture from the atmosphere, Technical Proceedings of the 2009 Clean Technology Conference and Trade Show, 2009, pp. 175-178.

(Continued)

*Primary Examiner* — Arun S Phasge
(74) *Attorney, Agent, or Firm* — Palo Alto Research Center Incorporated

(57) ABSTRACT

A process for producing a gas using an electrodialysis apparatus includes flowing at least two solutions and an electrode solution into the apparatus, pressurizing the apparatus at a stack pressure, applying a voltage to the apparatus's electrodialysis stack so a dissolved gas is generated in the second solution, flowing the second solution out of the apparatus, regenerating the gas out of the second solution, and collecting the gas. A process for generating a product, like a gas, liquid, or supercritical fluid, using an electrodialysis apparatus includes flowing at least two solutions and an electrode solution into the apparatus, adjusting the temperature and pressure so the product will be generated from the second solution, applying a voltage to the electrodialysis stack of the apparatus so that the product is generated in the second solution, flowing the second solution out of the apparatus, and regenerating the product from the second solution.

24 Claims, 11 Drawing Sheets

(56) References Cited

OTHER PUBLICATIONS

R.J. Pearson, J.W.G. Turner, M.D. Eisaman, and K.A. Littau, Sustainable Organic Fuels for Transport (SOFT)—A Concept for Compatible Affordable Mobility Using Carbon-Neutral Liquid Fuels, Proceedings of SIA (Société des Ingénieurs de l'Automobile) 2009, 11 pages, Strasbourg, France, Dec. 2-3, 2009.

R.J. Pearson, J.W.G. Turner, M.D. Eisaman, and K.A. Littau, Extending the Supply of Alcohol Fuels for Energy Security and Carbon Reduction, Proceedings of SAE 2009 Powertrains Fuels and Lubricants Meeting, Nov. 2009, 28 pages, San Antonio, TX, paper No. 2009-01-2764.

Matthew D. Eisaman, Luis Alvarado, Bhaskar Garg, Dan Larner, and Karl A. Littau, $CO_2$ concentration using bipolar membrane electrodialysis, poster presented at Gordon Research Conference on Electrochemistry, Ventura, CA, Jan. 10-15, 2010.

H. Nagasawa, A. Yamasaki, A. Iizuka, K. Kumagai and Y. Yanagisawa, A New Recovery Process of Carbon Dioxide from Alkaline Carbonate Solution via Electrodialysis, Dec. 2009, pp. 3286-3293, AIChE Journal, vol. 55, Issue 12.

H. Nagasawa, A. Yamasaki, and Y. Yanagisawa, Carbon Dioxide Recovery from Carbonate Solutions by an Electrodialysis Method, 6th Annual Conference on Carbon Capture & Sequestration, May 7-10, 2007, 7 pages.

Moon-Sung Kang, Seung-Hyeon Moon, You-In Park, and Kew-Ho Lee, Development of Carbon Dioxide Separation Process Using Continuous Hollow-Fiber Membrane Contactor and Water-Splitting Electrodialysis, Separation Science and Technology, 2002, pp. 178-1806, vol. 37, Issue 8.

X. Zhang, W. Lu, H. Ren, W. Cong, Sulfuric Acid and Ammonia Generation by Bipolar Membrane Electrodialysis: Transport Rate Model for Ion and Water Through Anion Exchange Membrane, Chemical and Biochemical Engineering Quarterly, 2008, pp. 1-8, vol. 22, Issue 1.

IPCC, Climate Change 2007: Synthesis Report. Contribution of Working Groups I, II and III to the Fourth Assessment Report of the Intergovernmental Panel on Climate Change, 2007, 104 pages, Geneva, Switzerland.

F.S. Zeman, D.W. Keith, Carbon Neutral Hydrocarbons, Philosophical Transactions of the Royal Society, 2008, pp. 3901-3918, vol. 366, Issue 1882.

M. Eisaman, D. Schwartz, S. Amic, R. Stumpp, D. Larner, J. Zesch, and K. Littau, Carbon-Neutral Liquid Fuel from Sunlight, Air, and Water, poster presented at Gordon Research Conference on Renewable Energy: Solar Fuels, Ventura, CA, Feb. 1-6, 2009.

M. D. Eisaman, L. Alvarado, D. Larner, P. Wang, B. Garg, and K. A. Littau, $CO_2$ separation using bipolar membrane electrodialysis, Energy and Environmental Science, Oct. 29, 2010, 10 pages, Royal Society of Chemistry, UK.

V. I. Zabolotskii, et al., Regeneration of Monoethanolamine-Based Sorbents of Carbon Dioxide by Electrodialysis with Bipolar Membranes, J. Appl. Chem., 1985, pp. 2222-2225, vol. 58.

International Conference and Exhibition, The Spark Ignition Engine of the Future: Facing the $CO_2$ and Electrification Challenges, Dec. 2 & 3, 2009.

Ameridia, "Bipolar Membrane Electrodialysis," http://www.ameridia.com/html/eb.html (Accessed Mar. 1, 2011).

Dr. Pieter Tans, "Trends in Atmospheric Carbon Dioxide", NOAA/ESRL, www.esrl.noaa.gov/gmd/ccgg/trends, (Accessed Mar. 1, 2011).

Calera, Green Cement for a Blue Planet, http://www.calera.com/index.php/technology/technology_vision/ (Accessed Mar. 1, 2011).

PARC, Renewable Liquid Fuels, http://www.parc.com/work/focus-area/adaptive-energy/ (Accessed Mar. 1, 2011).

G.A. Olah, A. Goeppert, and G.K. Surya Prakash, Beyond Oil and Gas: The Methanol Economy, 2006, pp. 239-247, Wiley-VCH, Germany.

\* cited by examiner

ELECTRODIALYTIC SEPARATION OF GAS FROM AQUEOUS CARBONATE AND BICARBONATE SOLUTIONS

STATEMENT REGARDING FEDERALLY SPONSORED RESEARCH AND DEVELOPMENT

This invention was made with Government support under contract NBCHC090074 awarded by DARPA, an agency of the United States Department of Defense. The Government has certain rights in this invention.

CROSS-REFERENCE TO RELATED APPLICATIONS

This application is related to U.S. patent application Ser. No. 12/969,465.

BACKGROUND

The concentration of atmospheric carbon dioxide ($CO_2$) continues to rise, as shown by, for example, IPCC, *Climate Change 2007: Synthesis Report. Contribution of Working Groups I, II and III to the Fourth Assessment Report of the Intergovernmental Panel on Climate Change*, 2007 [Core Writing Team, Pachauri, R. K and Reisinger, A. (eds.)], IPCC, Geneva, Switzerland, 104 pp. It is becoming increasingly imperative to invent efficient and cost-effective technologies for controlling the atmospheric $CO_2$ concentration. The concentration of atmospheric carbon dioxide ($CO_2$) is rising at the rate of approximately 2 parts per million per year (ppm/yr). The challenge of reducing the concentration of atmospheric $CO_2$ represents an opportunity to invent new, cost-effective technologies to solve this problem.

Techniques for removing $CO_2$ from streams of mixed gases, such as removing the $CO_2$ from power-plant flue-gas emissions or removing $CO_2$ from the atmosphere, typically involve a two-step process of capture and regeneration. First, the gas is contacted with an aqueous "pre-capture solution" that reacts with the $CO_2$ gas in the mixed-gas stream, "capturing" the $CO_2$ into what is then referred to as a "post-capture solution." Next, a stream of pure $CO_2$ gas is regenerated from this $CO_2$-rich aqueous post-capture solution. Various pre-capture solutions exist, with different solutions being preferred depending on the concentration of $CO_2$ in the mixed gas source. For mixed gas streams with low concentrations of $CO_2$—such as the atmosphere with a $CO_2$ concentration of 386 ppm as of 2009 as shown by Dr. Pieter Tans, NOAA/ESRL—aqueous hydroxide pre-capture solutions such as potassium hydroxide (KOH) or sodium hydroxide (NaOH), aqueous carbonate pre-capture solutions such as potassium carbonate ($K_2CO_3$) or sodium carbonate ($Na_2CO_3$), or aqueous bicarbonate pre-capture solutions such as potassium bicarbonate ($KHCO_3$) or sodium bicarbonate ($NaHCO_3$) are likely candidates for $CO_2$ pre-capture solutions. Other pre-capture solutions are known, for example, monoethanolamine (MEA), which is used in gas stream scrubbing applications to remove, for example, $CO_2$ from flue gas. The capture of $CO_2$ gas into these pre-capture solutions converts the original hydroxide/carbonate/bicarbonate pre-capture solutions into a more acidic post-capture solution consisting of a mixture of hydroxide (KOH or NaOH), carbonate ($K_2CO_3$ or $Na_2CO_3$), and/or potassium bicarbonate ($KHCO_3$) or sodium bicarbonate ($NaHCO_3$) post-capture solutions, as examples.

Once the $CO_2$ gas is captured from the mixed-gas stream into the pre-capture solutions in the ionic forms $CO_3^{(2-)}$ and/or $HCO_3^-$ to form the post-capture solutions, pure $CO_2$ gas is typically regenerated from the solution. The overall effect of this process of capture and regeneration is the separation and concentration of $CO_2$ gas from a pre-separation mixed-gas stream with a relatively low mole fraction of $CO_2$ gas into a post-separation gas stream that possesses a higher mole fraction of $CO_2$ gas than the pre-separation stream. Under the right conditions, the mole fraction of $CO_2$ in the post-separation stream may be unity, that is, the post-separation stream may be a pure stream of $CO_2$ gas. After capture and regeneration, the post-separation gas can then be, for example, geologically sequestered, or incorporated into useful products such as concrete, as shown by Calera, Green Cement for a Blue Planet, http://www.calera.com/index.php/technology/technology_vision/ (last visited Sep. 9, 2010); plastics, as shown by G. A. Olah et al., *Beyond Oil and Gas: The Methanol Economy*, Wiley-VCH (2006); or liquid hydrocarbon fuels, as shown by F. S. Zeman & D. W. Keith, Carbon Neutral Hydrocarbons, *Phil. Trans. R. Soc. A*, 366, 3901-3918 (2008), and PARC, Renewable Liquid Fuels, (last visited Sep. 9, 2010). Many of the possible uses of the regenerated $CO_2$, such as sequestration or reaction to liquid fuels, for example, require the pressurization of the $CO_2$ to pressures greater than 1 atm.

Bipolar membrane electrodialysis (BPMED) can be used to convert aqueous salt solution into acids and bases without the addition of other chemicals. A component of BPMED devices is ion exchange membranes used to separate ionic species in solution when an electrical field is applied across the membranes. Performing BPMED on certain solutions may create gas bubbles adjacent to the membrane surface that can block ion transport and reduce the effective membrane surface area, causing increased cell resistance and localized "hot spots" of very high current density that lead to shortened membrane lifetimes. As a result, commonly used input and output solutions are selected so that they do not evolve significant quantities of gas inside the membrane stack at ambient pressure, which excludes an entire class of gas-evolving solutions from electrodialytic treatment. Example embodiments address these and other disadvantages of the conventional art.

DETAILED DESCRIPTION

Figure 1:
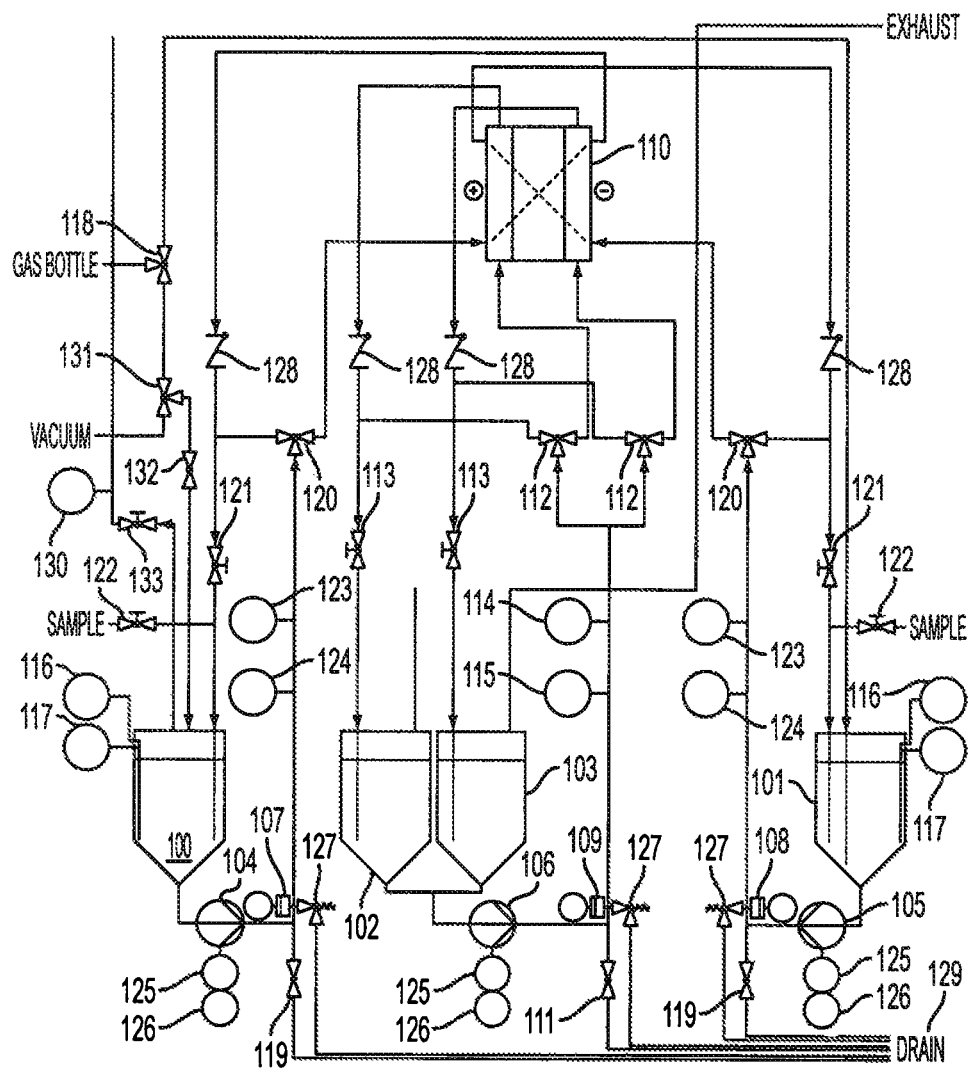
FIG. 1 is a schematic of an embodiment of a high-pressure electrodialysis system.

Currently available bipolar membrane electrodialysis (BPMED) apparatuses include an electrodialysis stack made up of at least one electrodialysis cell. The electrodialysis cell includes at least one bipolar membrane (BPM) such that, when an electrical potential is applied across the cell, the dissociation of water into hydrogen ($H^+$) and hydroxide ($OH^-$) ions occurs.

A BPM is formed from a cation-exchange layer laminated together with an anion-exchange layer, as well as a junction layer between the cation and anion layers. Water diffuses into the junction layer, reaching the usual equilibrium with $H^+$ and $OH^-$ ions according to its dissociation constant. Typically, a BPM is oriented such that the anion-exchange layer faces the anode (positive electrode) end of the BPMED apparatus and the cation-exchange layer faces the cathode (negative electrode) end of the apparatus. This orientation allows the $OH^-$ ions to be transported across the anion-exchange layer and the $H^+$ anions to be transported across the cation-exchange layer when an electrical potential is applied across the membrane stack. Simultaneously, the constituent cations and anions of an input salt solution are separated under the applied electrical potential via ion exchange membranes—either anion exchange membranes (AEMs), cation exchange membranes (CEMs), or some combination of the two. The $OH^-$ ($H^+$) ions "produced" by the BPM then combine with the cations (anions) separated from the input salt solution to produce basic (acidic) output solutions containing the parent acid and base of the input salt. Depending on the membrane configuration, a diluted salt solution may also be produced as output in addition to the acid and base output solutions.

A BPMED membrane stack can have either a two-compartment or a three-compartment configuration. In a two-compartment configuration, adjacent membranes may alternate between BPM and AEM to form a membrane stack of the form BPM, AEM, BPM, AEM, etc.; or adjacent membranes may alternate between BPM and CEM to form a membrane stack of the form BPM, CEM, BPM, CEM, etc. In a three-compartment cell, adjacent membranes may cycle from BPM to AEM to CEM, forming a membrane stack of the form BPM, AEM, CEM, BPM, AEM, CEM, etc. Electrodialysis without bipolar membranes is also possible, and consists of a two-compartment configuration formed by an alternating series of AEM and CEM to form a membrane stack of the form AEM, CEM, AEM, CEM, AEM, etc.

As mentioned above, gas bubbles inside commercially available BPMED systems result in gas bubbles adjacent to the membrane surface that can block ion transport in this region and reduce the effective membrane surface area, resulting in increased resistance and localized "hot spots" of very high current density that lead to shortened membrane lifetimes. As a result, commonly used input and output solutions are selected so that they do not evolve significant quantities of gas inside the membrane stack at ambient pressure. This excludes an entire class of gas-evolving solutions from electrodialytic treatment.

In an embodiment, these challenges are overcome by operating an electrodialysis apparatus at high pressure, i.e., above ambient pressure. In an embodiment, the operating pressure is sufficiently high, given other process conditions, that a gas that would typically evolve out of solution into the membrane stack at ambient pressure instead remains dissolved in solution, preventing gas bubble evolution inside the membrane stack itself. In an embodiment, the pressure of the solution containing the dissolved gas can be reduced downstream of the membrane stack so that the dissolved gas evolves out of solution and can be collected for other uses, if desired. In an embodiment, the pressure to which the solution is reduced can be any pressure less than the operating pressure of the membrane stack. In this way, the gas can be evolved at pressures greater than ambient pressure, and can also be evolved at pressures less than ambient pressure, if desired. Electrodialysis apparatuses according to certain embodiments may allow, for example, for energy-efficient, high-rate concentration of $CO_2$ in a compact, reliable unit from the aqueous carbonate/bicarbonate capture solutions to pure or nearly pure $CO_2$ gas suitable, for example, to sequester, to incorporate into useful products, or to react with other inputs to synthesize liquid hydrocarbon fuels.

It will be understood that whether gas, liquid, supercritical fluid, or some combination thereof is generated using embodiments of the process described herein depends on 1) the temperature and pressure at which the electrodialysis is performed, and 2) the input solution composition. For example, when input solutions containing $CO_2$ are used, either $CO_2$ gas, $CO_2$ liquid, or supercritical $CO_2$ may be generated, depending on the temperature and pressure used. When the operating pressure and temperature fall on the gas portion of the $CO_2$ phase diagram, for example at a pressure of approximately 10 atm and a temperature of approximately 20° C., $CO_2$ is generated in the output solution as a gas. When the operating pressure and temperature used fall within the liquid portion of the $CO_2$ phase diagram, for example approximately 100 atm and 20° C., $CO_2$ liquid is generated. When the operating pressure and temperature are high enough to pass the critical point of $CO_2$, for example approximately 75 atm and 35° C., supercritical $CO_2$ fluid is generated. In any of these cases, the $CO_2$ gas, liquid, or supercritical fluid can be regenerated from the output solution by known methods, such as gas/liquid, liquid/liquid or liquid/supercritical fluid separation. It will be understood that other gas, liquid, or supercritical fluid products besides $CO_2$, such as $SO_2$ or $NH_3$, can be generated using high-pressure electrodialysis, depending on the input solution used. The temperature of the electrodialysis process may be controlled by, for example, direct heating of the input solutions.

In some embodiments, a gas is absorbed into aqueous solution at some pressure $p_{low}$. High-pressure electrodialysis is then performed on the solution, and then the same gas is regenerated at a pressure $p_{high}$ with $p_{high} > p_{low}$. In this way, the embodiments may be used as novel gas pressurization devices capable of replacing inefficient mechanical compressors.

By pressurizing the solutions (electrode, first, second, and any third solutions) in the stack and then performing ion transport into a solution from which gas evolves, pressurization is accomplished more efficiently than with standard processes. In the case of $CO_2$, this allows direct generation of $CO_2$ at the pressures required for certain uses of the regenerated $CO_2$, such as sequestration and reaction to a liquid fuel, for example. This may also be a benefit for other gases that could be directly regenerated at the elevated pressure required for a subsequent reaction step. For example, $SO_2$ gas can be produced when aqueous sulfite or bisulfate solutions are input into the system and made more acidic via operation of the system, and NH₃ gas can be produced when aqueous ammonium solutions are input into the system and made more basic via operation of the system.

Processes to generate gas using high-pressure electrodialysis disclosed here reduce the energy consumption of electrodialysis of gas-evolving solutions, especially at the high current densities typically desired for real-world application. Embodiment processes also reduce the voltage across the electrodialysis membrane stack for electrodialysis of gas-evolving solutions, especially at the high current densities typically desired for real-world application.

Electrodialytic generation of $CO_2$ has the potential to be less destructive to and more compatible with the homogenous catalysts for $CO_2$ capture than thermal/chemical regeneration methods. It also has the potential to be less capital intensive and space-consuming than thermal/chemical regeneration methods, and to be more easily scaled down for mobile applications, such as military fuel generation, than thermal/chemical regeneration methods.

High-Pressure Electrodialysis System

FIG. 1 is a schematic of an embodiment of a high-pressure electrodialysis system. The system consists of three different loops: one for a first solution, one for a second solution, and one for an electrode solution. In another embodiment, the system consists of four different loops: one for a first solution, one for a second solution, one for a third solution, and one for an electrode solution. Although FIG. 1 depicts a system with three loops such that an apparatus for conducting two-compartment BPMED or electrodialysis without bipolar membranes can be incorporated in the system, it will be appreciated that the system can be adapted to instead incorporate a three-compartment BPMED apparatus by incorporating an additional loop for a third solution.

In an embodiment, the first solution is a basic solution and the second solution is an acidic solution. In an embodiment, the first solution is an acidic solution and the second solution is a basic solution. An electrode solution may be, for example, an electrolyte. In an embodiment incorporating four loops, the third solution may be, for example, a salt solution that is diluted upon passing through the operating electrodialysis unit.

Each loop can be operated in either bypass or stack mode. When a loop operates in bypass mode, the solutions bypass the electrodialysis membrane stack of the high-pressure electrodialysis apparatus 110. Each loop includes one or more tanks (for example, first solution tank 100), a pump (for example, first solution pump 104), a pulsation dampener (for example, first solution pulsation dampener 107), one or more temperature and pH meters (for example, meter 116), one or more temperature and conductivity meters (for example, meter 117), one or more pressure and flow meters (for example, meters 123 and 123), valves to change the operation mode between bypass mode and stack mode (for example, valves 112 and 120), and a valve to adjust the pressure of the electrodialysis apparatus 110 (for example, valve 121).

In an embodiment, the high-pressure electrodialysis system also includes a high-pressure electrodialysis apparatus 110. In an embodiment, the high-pressure electrodialysis system includes a high-pressure electrodialysis apparatus according to one of the embodiments disclosed in U.S. patent application Ser. No. 12/969,465, the disclosure of which is incorporated herein by reference in its entirety.

Figure 2:
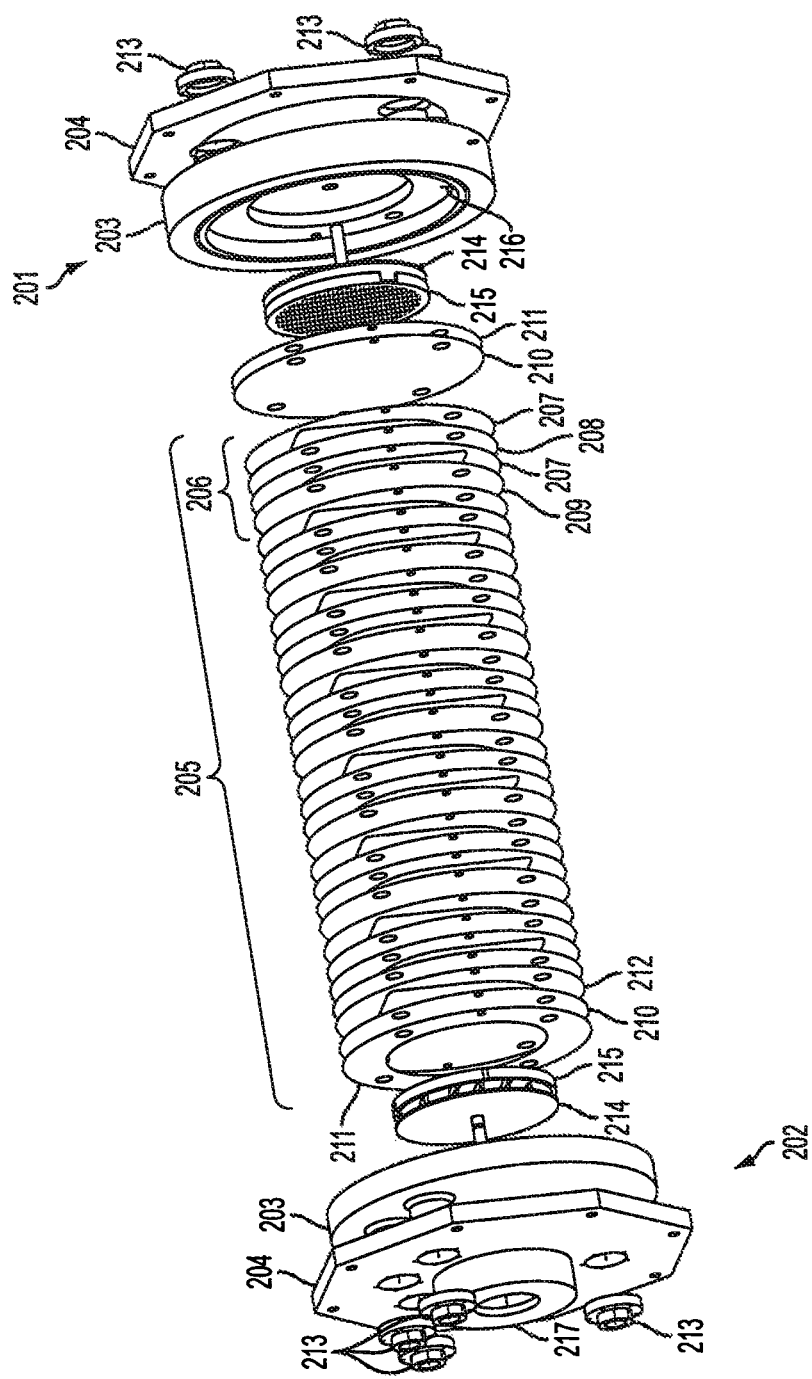
FIG. 2 is an exploded view of an embodiment of a high-pressure electrodialysis apparatus for use in a high-pressure electrodialysis system.

FIG. 2 shows an exploded view of a high-pressure electrodialysis apparatus for use in a high-pressure electrodialysis system according to an embodiment. The high-pressure electrodialysis apparatus includes an anode (held at a positive electrical potential relative to the cathode) end 201 and a cathode (held at a negative electrical potential relative to the anode) end 202. The apparatus includes a housing that includes axial support members 203 and reinforcing members 204. When the apparatus is assembled, the axial support members 203 are mated together to form a cell chamber in which an electrodialysis membrane stack 205 is received. The reinforcing members 204 are configured to apply a compressive force in the axial direction when they are coupled together, for example, by a bolted connection, such that the axial support members 203 are mated and the electrodialysis apparatus can operate at pressures above ambient pressure, ambient pressure being defined as the pressure naturally occurring in the environment surrounding the apparatus. At an elevation of sea-level, the ambient pressure is typically around 1 atm, or 101.325 kPa. For example, in an embodiment, the high-pressure electrodialysis apparatus can operate at pressures up to and including 20 atm. In an embodiment, the high-pressure electrodialysis apparatus can operate at pressures above 20 atm. In an embodiment, the axial support member 203 at the anode end 201 includes at least one pressurization port 216. The pressurization port 216 allows the pressure between the interior of the electrodialysis membrane stack 205 and the cell chamber formed by the mating of axial support members 203 to equalize by diverting a portion of the electrode solution into the region of the cell chamber outside the electrodialysis stack 205.

The electrodialysis stack 205 includes one or more electrodialysis cells 206. The electrodialysis stack 205 may include one or more cells 206 configured to carry out electrodialysis without bipolar membranes, or one or more cells configured to carry out BPMED. Cells configured to carry out BPMED may be either two-compartment or three-compartment cells. For example, the electrodialysis cell 206 in FIG. 2 includes two cell gaskets 207 arranged in alternating order with first and second ion exchange membranes 208 and 209. The cell 206 could carry out electrodialysis without bipolar membranes if, for example, first ion exchange membrane 208 was an AEM and second ion exchange membrane 209 was a CEM. Alternatively, the cell could carry out BPMED if, for example, first ion exchange membrane 208 was a BPM, and second ion exchange membrane 209 was an AEM or a CEM. It will be recognized that other configurations of membrane types may be possible, depending on input solutions used and the desired output solution.

The electrodialysis stack 205 may also include end gaskets 211 at one or both ends of the stack, end ion exchange membranes 210 at one or both ends of the stack, and an additional cell gasket 212 interposed between the nth electrodialysis cell 206 and the end ion exchange membrane 210 at the cathode end 202 of the membrane stack 205. It will be recognized that whether end ion exchange membranes 210 and an additional cell gasket 212 are needed, and what types of ion exchange membranes 210 are appropriate, depends on the input solutions used and the desired output solution.

Figure 3:
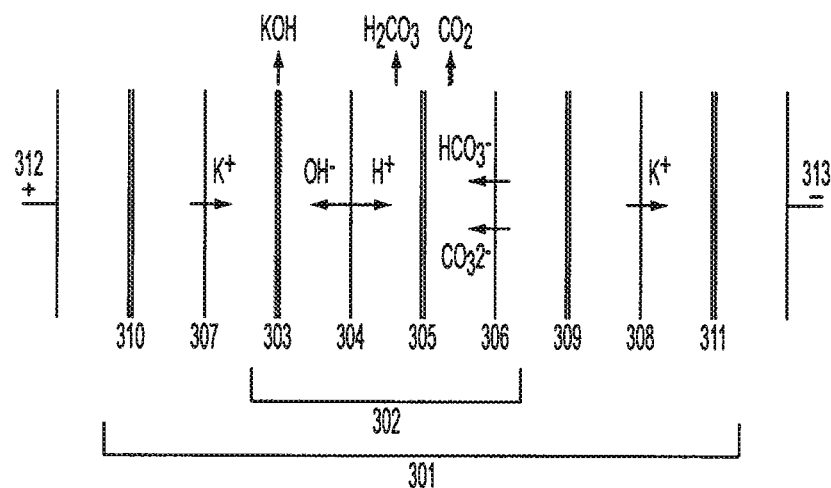
FIG. 3 is a schematic of electrodialysis membrane stack operation for generating $CO_2$ gas according to an embodiment.

FIG. 3 shows a schematic of electrodialysis membrane stack operation used to generate $CO_2$ gas in a high-pressure electrodialysis apparatus that contains one two-compartment BPMED cell. Although $CO_2$ generation is depicted, it will be understood that other gases may be generated using the illustrated stack configuration and process, depending on the inputs into the system.

Turning to FIG. 3, in an electrodialysis stack 301 that includes one two-compartment BPMED cell 302, the electrodialysis cell 302 is composed of two cell gaskets 303 and 305, and two ion exchange membranes 304 and 306 arranged in alternating order in the axial direction with the cell gaskets 303 and 305. The electrodialysis stack 301 also includes two end ion exchange membranes 307 and 308; the electrodialysis cell 302 is interposed between the two end ion exchange membranes 307 and 308. The electrodialysis stack also includes an additional cell gasket 309 interposed between the second ion exchange membrane 306 of the electrodialysis cell 302 and the second end ion exchange membrane 308. The electrodialysis stack 301 also includes two end gaskets 310 and 311; the first end gasket 310 is interposed between the anode end electrode 312 of the apparatus and the first end ion exchange membrane 307, and the second end gasket 311 is interposed between the cathode end electrode 313 of the apparatus and the second end ion exchange membrane 308.

In an embodiment where the electrodialysis stack is configured to perform two-compartment BPMED, the first ion exchange membrane 304 is a BPM, the second ion exchange membrane 306 is an AEM, and the end ion exchange membranes 307 and 308 are CEMs. A basic solution (pH>7) is generated between the first OEM 307 and the BPM 304, and an acidic solution (pH<7) is generated between the BPM 304 and the AEM 306. Depending on system parameters, such as the concentration of dissolved species, pH, and absolute pressure, gas may evolve out of the acidic solution between the BPM 304 and the AEM 306, or the gas may remain dissolved in the acidic solution. For example, when $CO_2$ gas is dissolved in the acidic solution, for a given concentration of dissolved $CO_2$ and a given pH of the acidic solution, if the pressure is sufficiently high all the $CO_2$ gas will remain dissolved in solution. As an example, the input aqueous solutions are an electrode solution of KOH flowing between the anode 312 and the end OEM 307 in the solution compartment defined by gasket 310 and also flowing between the cathode 313 and the end OEM 308 in the solution compartment defined by gasket 311; a base solution of $KHCO_3$ and $K_2CO_3$ flowing between the end OEM 307 and BPM 304 in the solution compartment defined by gasket 303 and also flowing between the AEM 306 and the end OEM 308 in the solution compartment defined by gasket 309; and an acid solution of $KH_2PO_4$ and $H_3PO_4$ flowing between the BPM 304 and the AEM 306 in the solution compartment defined by gasket 305. Under such conditions, $K^+$ ions are transferred across end OEM 307 from the electrode solution in the compartment defined by gasket 310; $OH^-$ and $H^+$ ions are dissociated across the BPM 304; and $HCO_3^-$ and $CO_3^{2-}$ are transferred across AEM 306 from the basic solution in the compartment defined by gasket 309. The $K^+$ ions combine with the dissociated $OH^-$ ions to generate KOH between the first OEM 307 and the BPM 304; the $H^+$ ions combine with $HCO_3^-$ and $CO_3^{2-}$ ions to form $H_2CO^3$ and dissolved $CO_2$ in the solution compartment defined by gasket 305 between the BPM 304 and the AEM 306.

In an embodiment, the electrodialysis stack 205 includes more than one two-compartment cell. In an embodiment, the electrodialysis stack includes, for example, seven two-compartment cells. The electrodialysis apparatus can be adapted to receive any other number of cells. In another embodiment, the cell is not configured to perform BPMED, but rather performs electrodialysis without bipolar membranes. For example, the first ion exchange membrane 304 may be an AEM, and the second ion exchange membrane 306 may be a CEM.

Figure 4:
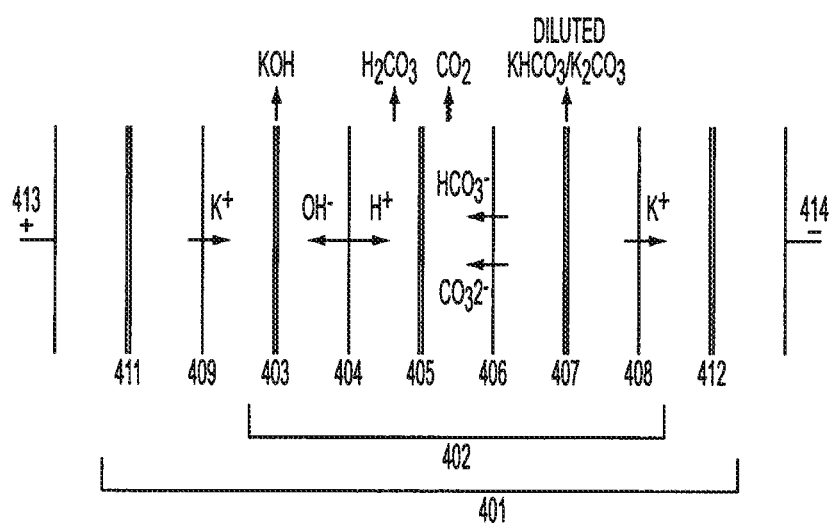
FIG. 4 is a schematic of electrodialysis membrane stack operation for generating $CO_2$ gas according to an embodiment.

In an embodiment, the electrodialysis stack includes one or more three-compartment cells instead. FIG. 4 shows a schematic of electrodialysis stack operation to generate $CO_2$ gas in a high-pressure BPMED apparatus that contains one three-compartment cell. Although $CO_2$ generation is depicted, it will be understood that other gases may be generated using the illustrated stack configuration and process, depending on the inputs into the system.

Turning to FIG. 4, in an embodiment of an electrodialysis stack 401 that includes one three-compartment electrodialysis cell 402, the electrodialysis cell 402 is composed of three cell gaskets 403, 405, 407, and three ion exchange membranes 404, 406, 408 arranged in alternating order in the axial direction with the cell gaskets 403, 405, 407. The electrodialysis stack 401 also includes two end gaskets 411 and 412; the first end gasket 411 is interposed between the anode end electrode 413 of the apparatus and the end ion exchange membrane 409, and the second end gasket 412 is interposed between the cathode end electrode 414 of the apparatus and the electrodialysis cell 402. The electrodialysis stack 401 also includes one end ion exchange membrane 409 interposed between the electrodialysis cell 402 and the end gasket 411.

In such an embodiment, the first ion exchange membrane 404 is a BPM, the second ion exchange membrane 406 is an AEM, the third ion exchange membrane 408 is a CEM, and the end ion exchange membranes 409 is a CEM. A basic solution is generated between the end ion exchange membrane 409 and the BPM 404, an acidic solution and $CO_2$ gas are generated between the BPM 404 and the AEM 406, and a desalted input solution is generated between the AEM 406 and the CEM 408. For example, the input solutions may include an electrode solution of KOH in compartments defined by gaskets 411 and 412, a basic solution of $KHCO_3$ and $K_2CO_3$ in compartments defined by gaskets 403 and 407, and an acidic solution of $KH_2PO_4$ and $H_3PO_4$ in the compartment defined by gasket 405. Under such conditions, $K^+$ ions are transferred across end CEM 409 from the electrode solution in the compartment defined by end gasket 411 and across CEM 408 into the electrode solution in the compartment defined by end gasket 412; $OH^-$ and $H^+$ ions are dissociated across the BPM 404; and $HCO_3^-$ and $CO_3^{2-}$ are transferred across AEM 406 from the basic solution in the compartment defined by gasket 407. The $K^+$ ions combine with the dissociated $OH^-$ ions to generate KOH between the end ion exchange membrane 409 and the BPM 404; the $H^+$ ions combine with $HCO_3^-$ and $CO_3^{2-}$ ions to form $H_2CO_3$ and dissolved $CO_2$ in the solution compartment defined by gasket 405 between the BPM 404 and the AEM 406; and a diluted $KHCO_3$ and $K_2CO_3$ solution, less concentrated than the input solution, is generated between the AEM 406 and the CEM 408.

In an embodiment, the electrodialysis stack 401 includes more than one three-compartment cell 402. In an embodiment, the electrodialysis stack 401 includes, for example, seven three-compartment cells 402. The electrodialysis apparatus can be adapted to receive any other number of cells.

Turning back to FIG. 2, the high-pressure electrodialysis apparatus also includes ports, which allow the solutions to flow into and out of the apparatus. The ports may be bossed ports formed in the axial support members 203 that slide through bossed port holes formed in the reinforcing members 204; flange adapters 213 may then be fitted over each bossed port and attached to the reinforcing members 204. In an embodiment where the electrodialysis stack 205 includes one or more non-BPMED or two-compartment BPMED cell, each end 201 and 202 of the housing includes four ports total: one first solution port, one second solution port, and two electrode solution ports. The first and second solution ports may be inlet ports at the anode end 201, allowing solutions to flow into the apparatus; the corresponding first and second solution ports at the cathode end 202 would be outlet ports, allowing solutions to flow out of the apparatus. The flow of the apparatus can be reversed if desired such that the ports at the anode end 201 are outlet ports and those at the cathode end 202 are inlet ports. In addition, the flow can be such that there is an input port for one solution and an output port for the other solution at anode end 201, and an output port for the solution whose input port is at the anode end and an input port for the solution whose output port is at the anode end, at the cathode end 202. Each end of the apparatus has both an electrode solution inlet port and an electrode solution outlet port. In an embodiment where the electrodialysis stack 205 includes one or more three-compartment BPMED cells, each end 201 and 202 of the housing includes five ports total: one first solution port, one second solution port, one third solution port, and two electrode solution ports. The flows through these ports may be the same as those described above for a two-compartment or non-BPMED cell stack.

The high-pressure electrodialysis apparatus also includes two electrodes 214, one at either end of the electrodialysis stack 205, and two electrode grates 215, each interposed between one of the electrodes 214 and the electrodialysis stack 205. In an embodiment, the electrodialysis apparatus also includes two stress reduction cylinders 217, one attached to each reinforcing member 204.

In an embodiment, the electrodialysis apparatus shown in FIG. 2 is incorporated into the high-pressure electrodialysis system shown in FIG. 1 as the electrodialysis apparatus 110. When the electrodialysis apparatus 110 includes a BPMED electrodialysis stack, the electrodialysis system of FIG. 1 can be used, for example, to regenerate $CO_2$ gas from aqueous carbonate and bicarbonate solutions. Depending on system parameters, such as the concentration of dissolved species, pH, and absolute pressure, gas may evolve out of solution inside the electrodialysis apparatus, or the gas may remain dissolved in the solution until the solution is no longer inside the electrodialysis apparatus. For example, for a given concentration of dissolved $CO_2$ and a given pH of the solution, if the pressure is sufficiently high, all the $CO_2$ gas will remain dissolved in solution. The pressure can then be decreased when the solution is no longer inside the electrodialysis apparatus, resulting in the evolution of $CO_2$ gas out of solution. This prevents the evolution of gas inside the apparatus, thereby avoiding the deleterious effects of gas evolution inside the apparatus such as increased voltage and energy consumption, and localized "hot spots" of high current density that can lead to membrane damage and/or reduced membrane lifetimes.

Turning back to FIG. 1, in an embodiment, tanks 100-103 of the high-pressure electrodialysis system are designed to withstand pressures up to approximately 20 atm with a safety factor of about 3. The tanks 100-103 can be pressurized to any pressure between ambient pressure and the absolute pressure of the electrodialysis stack. When the tanks are so pressurized, gas evolves out of solution at a pressure above ambient pressure, i.e., at a pressure substantially the same as the pressure of the tanks 100-103. In an embodiment, the covers of the tanks 100-103 have three threaded holes of a diameter of ¼ inch for optional pipe connections and a fill cap of a diameter of 1⅛ inch to fill the tanks 100-103.

In an embodiment, the first and second solution tanks 100 and 101 each have both an inlet coming from the bypass or the electrodialysis apparatus 110 and an outlet going to the first solution pump 104 or second solution pump 105 respectively. Both tanks 100 and 101 have a feed-through where the pH and the conductivity meters 116 and 117 are introduced into the solution. The cover of the second solution tank 101 is equipped with a vent and a 1⅛ inch pipe for gas infusion. In an embodiment, the first solution tank 100 has two windows to observe the evolution of gas bubbles from the solution. In an embodiment where the tank is pressurized, the tank cover may be equipped with a pressure sensor to know the pressure of the tank. The tank may also be equipped with two vents: one that leads the gas to a valve and a flow meter in order to regulate and measure the flow of gas evolving from the solution, and one to empty the headspace and flush the tank with gas.

In an embodiment, the first and second solution tanks 100 and 101 both have meters for measuring, showing, and recording certain information about the tank conditions. For example, the first solution tank 100 may include a temperature and pH information and recording to computer (TXIR) meter 116 that measures, shows, and records the temperature and pH of the first solution. The first solution tank 100 may also include a TXIR meter 117 that measures, shows, and records the temperature and conductivity of the first solution. The second solution tank 101 may also have a TXIR meter 116 and TXIR meter 117 that perform the same functions for the second solution.

In an embodiment, the second solution tank 101 may also have a means for infusing gas into the second solution in order to regenerate the gas while operating through the electrodialysis stack. For example, in an embodiment electrodialysis system that is used to generate $CO_2$ gas, the second solution tank 101 may be a base solution tank that has a $CO_2$ gas bottle connected to it by, for example, a ⅛ inch pipe. The infusion of gas into the first solution tank 101 can be turned on or off using valve 118.

In an embodiment, the first solution loop also includes a valve 119 to drain the first solution loop and a valve 120 to change the operation from the bypass to the electrodialysis stack mode. The second solution loop also includes valves 119 and 120 that perform the same functions with respect to the second solution loop. The first solution loop also includes a valve 121 to change the pressure in the electrodialysis system and a valve 122 for taking samples. The second solution loop also includes valves 121 and 122 that perform the same functions with respect to the second solution loop. In an embodiment, the pressure and the flow of the first solution loop are measured and recorded by pressure information and recording to computer (PIR) meter 123 and flow information and recording to computer (FIR) meter 124, respectively. The second solution loop also includes PIR meter 123 and FIR meter 124 that perform the same functions with respect to the second solution loop.

In an embodiment, the electrode solution loop has two tanks 102-103. Each tank 102-103 has an inlet coming from the bypass or the electrodialysis apparatus 110 and an outlet going to the electrode solution pump 106. The electrode solution tank 102 is for the electrode solution coming from the anode end 201 of the electrodialysis apparatus 110 (see FIG. 2) from where oxygen will evolve. The electrode solution tank 103 is for the fluid coming from the cathode end 202 of the electrodialysis apparatus 110 (see FIG. 2) from where hydrogen will evolve. In an embodiment, each tank 102-103 is equipped with a pipe connection that has a ¼ inch barb fitting to vent the tanks from the evolving gases. The vent of tank 103 may be connected to the building exhaust to avoid high $H_2$ concentrations in the atmosphere.

In an embodiment, the electrode solution loop also has a valve 111 to drain the electrode solution loop. It may also include two valves 112 to change the operation from the bypass to the electrodialysis stack mode. It may also include two valves 113 that can be varied in order to change the pressure in the electrodialysis system. In an embodiment, the pressure and flow of the electrode solution loop are measured and recorded by PIR meter 114 and FIR meter 115, respectively.

In an embodiment, each port of the electrodialysis apparatus 110 (see FIG. 2) is equipped with check valves 128 to avoid the flow of any solution into the electrodialysis apparatus 110 while the system operates in the bypass mode. Each loop has a pulsation dampener 107 to damp the pressure oscillation caused by the operation of the positive displacement pumps 104.

In an embodiment, the electrodialysis system includes valve 131, a three-way valve connected to a house vacuum. Before the electrodialysis system is used, valve 131 can be alternately opened and closed with valve 118, which is connected to a cylinder of whatever gas the system is being used to generate, for example, $CO_2$. Doing so purges the headspace of first solution tank 100 of air so that the headspace contains nothing but whatever gas the system is being used to generate, for example, $CO_2$. Purging the headspace in this manner ensures that all the gas that flows through FIR meter 130 is pure, or as close to pure as possible, which ensures accurate measurements of the gas flow by FIR meter 130.

In an embodiment, the electrodialysis system includes motors 125, one motor for each of the first, second, and electrode solution loops. It also includes Hz/RPM controllers 126, one each for the first, second, and electrode solution loops. It also includes pressure relief valves 127, one each for the first, second, and electrode solution loops. It also includes valve 132, a two-way valve that allows the operator of the system to connect or block the flow from the vacuum or gas cylinder; which is blocked depends on the settings of valve 131 and valve 118. It also includes valve 133, a needle valve for controlling the gas flow through FIR meter 130. The electrodialysis system also includes a drain 129 to receive any solution drained from tanks 100-103 via their respective valves 111 and 119.

In an embodiment, the values of each measuring position of the system are read and recorded every five seconds by computer software. These values can be saved and recalled when desired. Table 1 summarizes the measuring positions of one embodiment of a system and their functions. Other measurement positions not shown on the schematic are those that measure the voltage and current going through the membrane stack.

TABLE 1

Measuring Positions and their Functions

| Measuring Position | Function | Input/Output |
|---|---|---|
| FIR meters 115, 124 | Measure, show, and record the flow of the loop | Input |
| PIR meters 114, 123 | Measure, show, and record the pressure of the loop | Input |
| TXIR meters 116, 117 | Measure, show, and record the temperature and either the pH or the conductivity of the base or acid solution | Input |
| FIR meter 130 | Measures, shows, and records the flow of the gas evolving from the acid tank | Input |
| VFD meters 126 | Record and control the frequency or RPM of the motor. Builds a control loop with the FIR to control the flow of the loop. | Output |

In an embodiment, the electrodialysis system of FIG. 1 can be constructed with the following: positive displacement pumps (model M03SASGSSEMA pump from HydraCell); variable frequency motor drives (model VS1SP61-1B VFD from Baldor); motors (model IDNM3583 from Baldor); pulsation dampeners (model 110-065 from HydraCell); pressure relief valves (model RV2MF-6N-A-S316 from Hy-Lok); flowmeters (model FTB4805 from Omega); pressure sensors (model PX219 from Omega); pH meters (model OrionStar from ThermoScientific); conductivity meters (model OrionStar from ThermoScientific); power supply (model XHR40-25 from Xantrex); gas flow meter (model FMA1605A from Omega); data acquisition module model USB-1616HS-4 from Measurement Computing); RS485 communication card (model PCI4S422 DB94PR from StarTech); USB to RS232 multiport convertor (model USB-8COM from VSCOM); stainless steel rack and secondary containment (in house design and outside fabrication); numerous 316SS valves, fittings, hoses, tubing (from McMaster-Carr); acid, base, and electrolyte tanks (in house design and fabrication); high-pressure electrodialysis apparatus (U.S. patent application Ser. No. 12/969,465); $H_2$ sensor for safety; vent system for exhaust gases; gas tank and regulator for headspace flushing and base gas infusion; and de-ionized (DI) water line for system flushing.

Process for Evolving Gas Using a High-Pressure Electrodialysis System

By using an electrodialysis system (see FIG. 1) that incorporates a high-pressure electrodialysis apparatus (see FIG. 2), gas can be produced at any pressure between ambient pressure and the absolute pressure of the electrodialysis stack from any gas-evolving solution. An embodiment of a high-pressure electrodialysis system was tested to determine process conditions for generating $CO_2$ gas from carbonate and bicarbonate solutions. Therefore, the following figures and their accompanying discussion will refer to a process according to one embodiment for generating $CO_2$ gas. However, it will be appreciated that embodiments of the high-pressure electrodialysis system, process, and preferred conditions described herein can be used to generate other gases besides $CO_2$, depending on what solutions are used. For example, $SO_2$ gas can be produced when aqueous sulfite or bisulfate solutions are input into the system and made more acidic via operation of the system; and $NH_3$ gas can be produced when aqueous ammonium solutions are input into the system and made more basic via operation of the system.

The ion transport that occurs in the electrodialysis stack is best understood by describing a process for evolving $CO_2$ gas using a high-pressure electrodialysis system. All experiments performed to determine process conditions were operated in steady-state mode, i.e., where the pH of the acid and base solutions is kept constant, resulting in steady-state behavior for measured quantities such as the rate of $CO_2$ gas evolution from the acid compartment, voltage, and energy consumption. In an experiment, a solution of 0.3M $KH_2PO_4$ and 15 mL of $H_3PO_4$ in 2.5 L of DI water was loaded into the acid tank. A solution of $KHCO_3$, $K_2CO_3$, and KOH in 2.5 L of DI water was loaded into the base tank; various concentrations of each of these solutes were used for different experimental runs. A solution of 2M KOH in 2.5 L of DI water was loaded into the electrode solution tank. Other concentrations of solutions may be used. For example, a concentration of base solution of 0.05 M to 2 M may be used; a concentration of acid solution of 0.05 M to 2 M may be used; and a concentration of electrode solution of 0.1M to 2 M may be used. However, any concentration for the base, acid, and electrode solutions may be used, including concentrations that are below or above these ranges.

The pumps of the electrodialysis system (see FIG. 1) were turned on to allow volumetric flow rate velocities of approximately 300 L/hr and 140 L/hr in the electrode solution and acid/base tanks, respectively. Other flow rate velocities may be used. For example, the electrode solution may have a flow rate velocity between 200 L/hr and 600 L/hr; the acid and base solutions may have flow rate velocities between 60 L/hr and 300 L/hr. However, any flow rate velocities for the base, acid, and electrode solutions may be used, including flow rate velocities that are below or above these ranges.

The acid and base solutions are each flowed from their respective tanks and into the high-pressure electrodialysis apparatus, through the electrodialysis stack, and then returned to their respective tanks to be pumped again through the electrodialysis apparatus. The electrode solution is pumped from one electrode solution tank and into the high-pressure electrodialysis apparatus at both the cathode and anode ends, flowed across the electrodes at each end, and then flowed back out of the apparatus at both ends and into a second electrode solution tank. By combining the electrode solution output from both ends of the apparatus into the same electrode solution tank, electroneutrality is preserved. By venting the tanks prior to recombining the solutions, the mixing of $H_2$ and $O_2$ gases is avoided.

The solutions may be allowed to flow for approximately 5-10 minutes until the pH and conductivity values stabilize after mixing with any water left behind in the setup from flushing the electrodialysis apparatus after any previous run. The high-pressure electrodialysis apparatus is then pressurized to the desired stack pressure via the adjustment of, for example, needle valves. In an embodiment, the stack pressure is any pressure greater than ambient pressure. In an embodiment, the stack pressure is 200 atm or less. As the process of pressurization sometimes causes the acid pH to increase slightly, additional $H_3PO_4$ may then be added to the acid tank until the acid pH is approximately 2.5. In this way, active pH control of the electrodialysis system is possible. Although the electrodialysis stack is pressurized at this point, in an embodiment all the tanks remain at ambient pressure. In a separate embodiment, the electrodialysis stack is pressurized to some pressure $p_{stack}$, and the tanks are pressurized to some pressure less than $p_{stack}$ and greater than ambient pressure $p_{tank}$.

The power supply is then connected to the electrodes of the high-pressure electrodialysis apparatus and the desired current value is set. A voltage ceiling is also set. In an embodiment, control software is used to set the desired current value and voltage ceiling; the power supply finds the required voltage less than or equal to the ceiling voltage that allows the desired current to be achieved. All experiments are run at a constant current. In an embodiment, the voltage is selected such that a certain current density ($mA/cm^2$) is achieved. In an embodiment, the current density is between 10 and 150 $mA/cm^2$. In an embodiment, the current density may be 150 $mA/cm^2$ or greater. In an embodiment, the current density may be 10 $mA/cm^2$ or lower.

Once the current starts to flow across the electrodialysis stack, ion transport begins and $CO_2$ gas starts to flow from the acid compartment. As $HCO_3^-$ and $CO_3^{2-}$ ions are transported into the acid compartment and $CO_2$ gas is generated—which may remain in solution or evolve out of solution, depending on the pressure (see FIGS. 3-4)—the pH of the acid compartment generally remains constant at about 2.5. However, after approximately five hours of continuous operation, the pH of the acid solution may begin to rise; if so, additional $H_3PO_4$ may be added to the acid solution to keep the pH in the range of approximately 2.5 to 2.8. As $HCO_3^-$ and $CO_3^{2-}$ ions are transported out of the base solution and replaced with $OH^-$ ions from the dissociation of water in the BPMs, the pH of the base solution increases. To keep the base solution pH constant at its starting value for a given experiment, pure $CO_2$ gas may be bubbled directly into the base solution from a pressurized tank of $CO_2$ gas. In this way, the acid and base solution pH values are kept constant during the experiment for a long enough period of time to allow steady-state behavior to be achieved. In an embodiment, an experimental run may continue until the pH, $CO_2$ rate, and energy consumption per mol of $CO_2$ are all observed to be constant for at least ten minutes.

Figure 5:
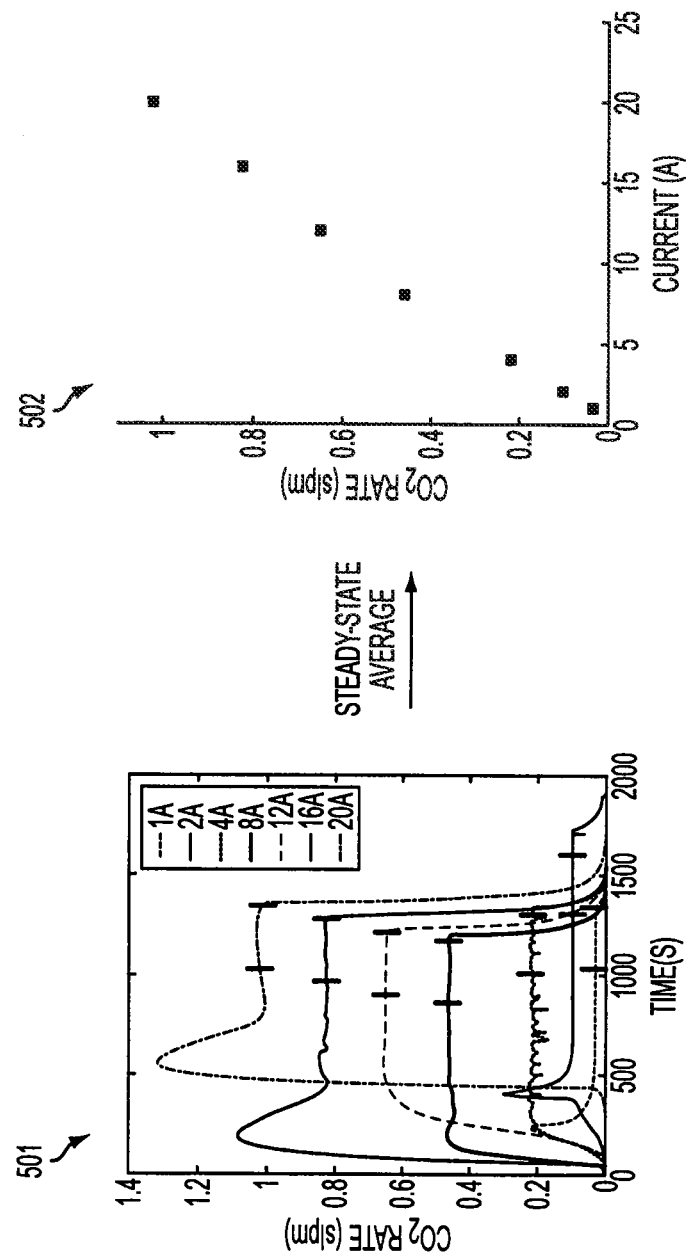
FIG. 5 is an example demonstration of steady-state data collection methodology.

FIG. 5 shows an example demonstration, for 0.5 M $K_2CO_3$ at 1 atm, of the methodology used for data collection under steady-state conditions. Panel 501 shows the rate of $CO_2$ gas flow out of the acid compartment versus time for seven different experimental runs corresponding to different current values. The rate fluctuates at the beginning of each experimental run as the rate at which $CO_2$ gas is bubbled into the base solution to maintain constant pH is tuned. For all current values measured, panel 501 shows that once the $CO_2$ bubbling rate is properly tuned to match the $CO_2$ transport rate out of the base solution and to keep the base pH constant, the rate of $CO_2$ flow out of the acid compartment reaches a constant steady-state value.

The experiment is continued until the pH, $CO_2$ rate, and energy consumption are all observed as approximately constant for ten minutes. FIG. 5 shows how steady-state average values are then calculated from this data. The data measured during the last five minutes of the ten-minute steady-state period, delineated in panel 501 by black vertical lines, are used to calculate steady-state average values, such as the steady-state average value of the rate of $CO_2$ gas evolution, shown in panel 502. In the experiment, the base pH never deviated more than 0.05 units of pH from its mean value within this five-minute window. This was true of the base pH and acid pH for all experiments performed.

Performance Comparison of a High-Pressure Electrodialysis Apparatus and a Commercial Unit In the case of electrodialysis of aqueous solutions of carbonate, such as $K_2CO_3$, and bicarbonate, such as $KHCO_3$, where $CO_2$ is generated, increasing the pressure in the electrodialysis apparatus will decrease the voltage and energy consumption for a given rate of $CO_2$ generation due to the suppression of membrane-area-reducing bubbles in the electrodialysis membrane stack. The following figures demonstrate this principle.

FIG. 6A-6D shows measured values of $CO_2$ rate density ($slpm/m^2$) (FIG. 6A), efficiency (FIG. 6B), voltage (Volts) (FIG. 6C), and energy ($kJ/molCO_2$) (FIG. 6D) for $KHCO_3$ at a pressure of 1 atm, i.e., approximately ambient pressure, for a commercial electrodialysis apparatus from Ameridia, and for a high-pressure electrodialysis apparatus, for example, the embodiment shown in FIG. 2. Efficiency (FIG. 6B) is defined as the number of gas molecules measured per electron charge of current transported; the ideal value is 1 for the case of $KHCO_3$ where the $CO_2$ is transported via the singly charged $HCO_3^-$ ion. All results in FIG. 6A-6D are plotted versus current density ($mA/cm^2$) rather than total current to aid in the comparison since the area per membrane is 200 $cm^2$ for the commercial Ameridia unit, but is approximately 179.74 $cm^2$ in one embodiment of a high-pressure electrodialysis apparatus. Experimental conditions were identical for the two experimental runs: the BPMs, AEMs, and CEMs used were Neosepta BP-1E, Neosepta AHA, Neosepta C66-10F, respectively; acid conductivity was approximately 22 mS/cm and base conductivity was approximately 46 mS/cm; acid pH was approximately 2.6 and base pH was approximately 8.6. In both cases, a two compartment BPMED configuration (see FIG. 3) was employed using an electrodialysis membrane stack that had a total of seven cells. As FIG. 6A-6D shows, the results for the two systems operating at 1 atm are largely identical, indicating the high-pressure electrodialysis apparatus works as expected.

Figure 6A:
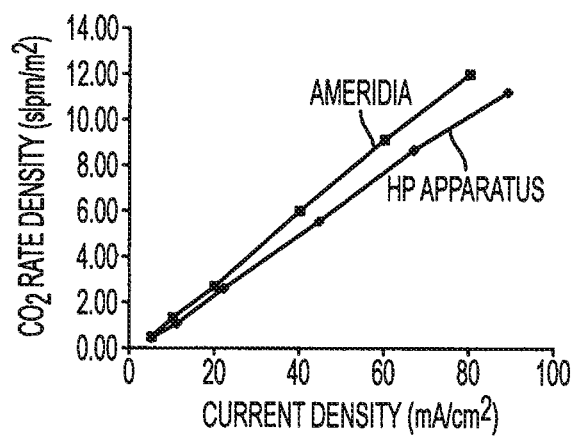
FIG. 6 is a comparison of experimental results for 0.5 M $KHCO_3$ flowed through an embodiment of a high-pressure electrodialysis apparatus operating at 1 atm and a commercial system operating at 1 atm.
Figure 6B:
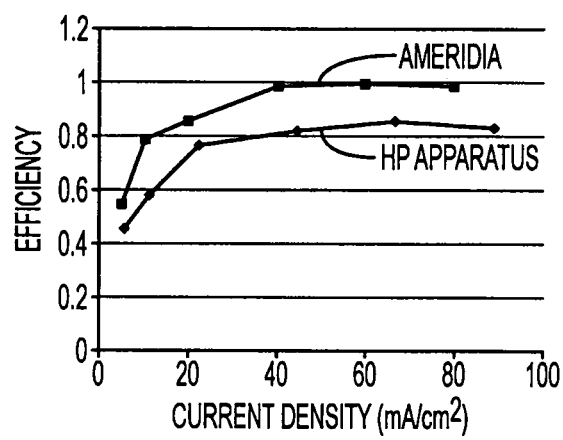
Figure 6C:
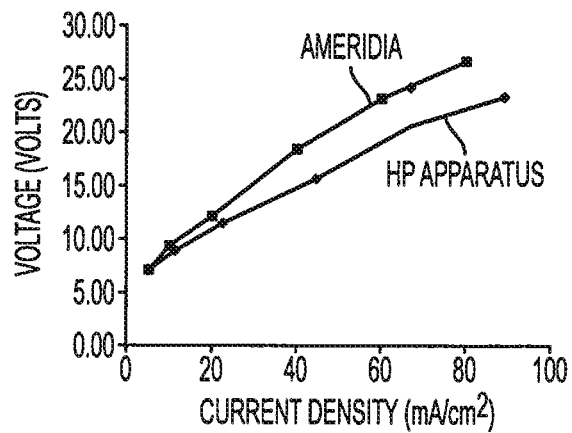
Figure 6D:
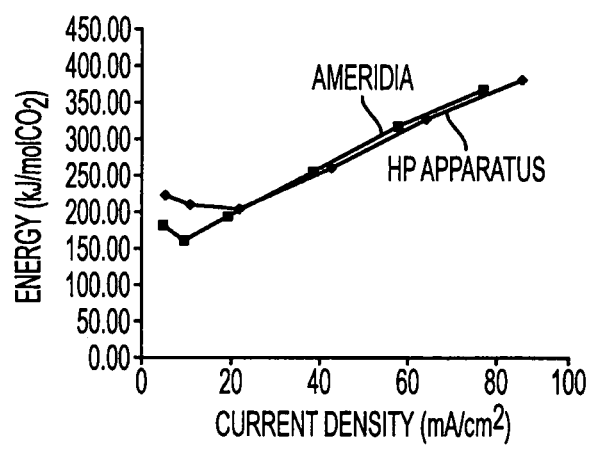

There are some differences between the commercial unit and the high-pressure electrodialysis apparatus. For a given current density, FIG. 6B shows that the efficiency of the commercial unit is slightly higher than the high-pressure apparatus, possibly due to the different flow patterns and spacer materials in the two apparatuses. This results in slightly lower $CO_2$ rate generation density for a given current density in the high-pressure apparatus, as shown in FIG. 6A. FIG. 6C shows that for a given current density, the voltage of the high-pressure apparatus is lower than the voltage of the commercial unit. This may be due to the different flow patterns, or may be due to the fact that the membranes used in the high-pressure apparatus were new while those used in the commercial unit had been used for previous experiments. The lower voltage and lower efficiency for the high-pressure apparatus combine to yield an energy consumption for a given current density, shown in FIG. 6D, that is approximately identical to the energy consumption of the commercial unit when the high-pressure apparatus is operated at ambient pressure.

A similar comparison of $CO_2$ rate density (slpm/m$^2$), efficiency, voltage (Volts), and energy (kJ/molCO$_2$) for $K_2CO_3$ at a pressure of 1 atm for a commercial electrodialysis apparatus from Ameridia and a high-pressure electrodialysis apparatus, such as the embodiment shown in FIG. 2, was also performed (not shown). The relative behaviors of $CO_2$ rate density, efficiency, voltage, and energy for the commercial unit and the high-pressure electrodialysis apparatus were approximately the same as those seen in FIG. 6 for $KHCO_3$.

The comparisons of the high-pressure electrodialysis apparatus and the commercial Ameridia unit at 1 atm for $K_2CO_3$ and $KHCO_3$ confirm that the high-pressure electrodialysis apparatus works as expected. Next, experiments were run at elevated, i.e., above 1 atm, pressures using a high-pressure electrodialysis system that incorporated a high-pressure electrodialysis apparatus, such as the embodiments shown in FIGS. 1-2. The results are described with respect to the following figures.

Figure 7A:
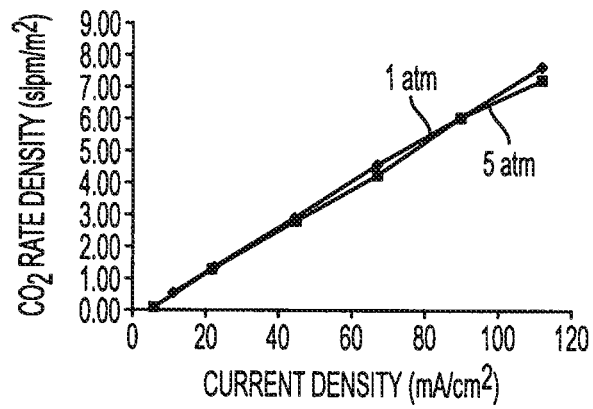
FIG. 7 is a comparison of experimental results for 0.5 M $K_2CO_3$ flowed through an embodiment of a high-pressure electrodialysis apparatus operating at 1 atm and 5 atm.
Figure 7B:
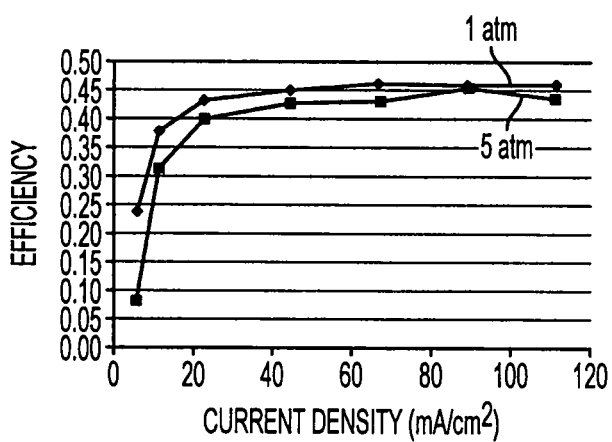
Figure 7C:
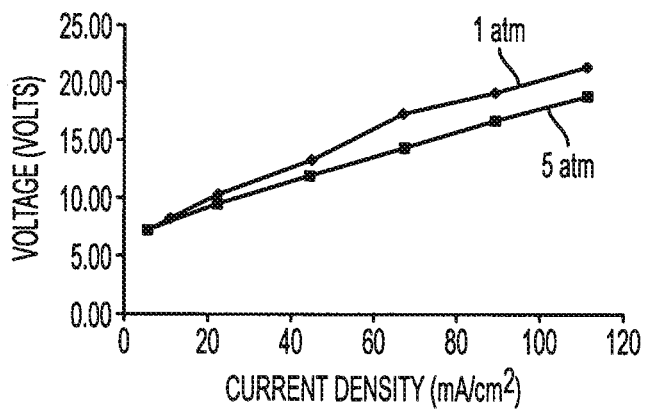

FIG. 7A-7D shows measured values of $CO_2$ rate density (slpm/m$^2$) (FIG. 7A), efficiency (FIG. 7B), voltage (Volts) (FIG. 7C), and energy (kH/molCO$_2$) (FIG. 7D) for 0.5 M $K_2CO_3$ at pressures of 1 atm and 5 atm for a high-pressure electrodialysis apparatus, such as the embodiment shown in FIG. 2. Efficiency (FIG. 7B) is defined as the number of gas molecules measured per electron charge of current transported. For a given current density (mA/cm$^2$), FIG. 7B shows that the efficiency at 1 atm is slightly higher than the efficiency at 5 atm. This results in slightly lower $CO_2$ rate generation density at 5 atm for a given current density, as shown in FIG. 7A. FIG. 7C shows that for a given current density, the voltage at 5 atm is lower than the voltage at 1 atm. While at current densities less than 10 mA/cm$^2$ the voltages are effectively equal, for current densities greater than 70 mA/cm$^2$, the voltage at 5 atm is at least 12% lower than the voltage at 1 atm. FIG. 8 plots the percent decrease in the measured total voltage at 5 atm compared to the voltage measured at 1 atm, plotted as a function of $CO_2$ rate density. The behavior shown in FIGS. 7-8 demonstrates that increased pressure prevents bubble evolution inside the electrodialysis stack, which reduces the resistance and voltage at a given current density by allowing a larger fraction of the membrane area to be available for ion transport, rather than being blocked by gas bubbles. The fractional effect on voltage increases as the rate of $CO_2$ evolution increases, as shown in FIG. 8. The magnitude of this effect seems to plateau at the highest $CO_2$ rates measured, possibly corresponding to a saturation of the current crowding effect of $CO_2$ bubbles as a function of $CO_2$ rate.

Figure 7D:
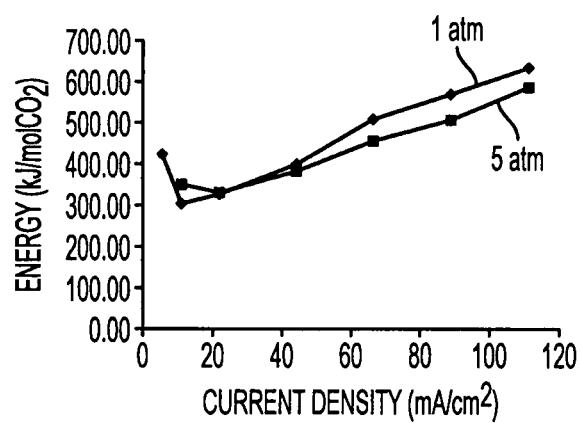
Figure 8:
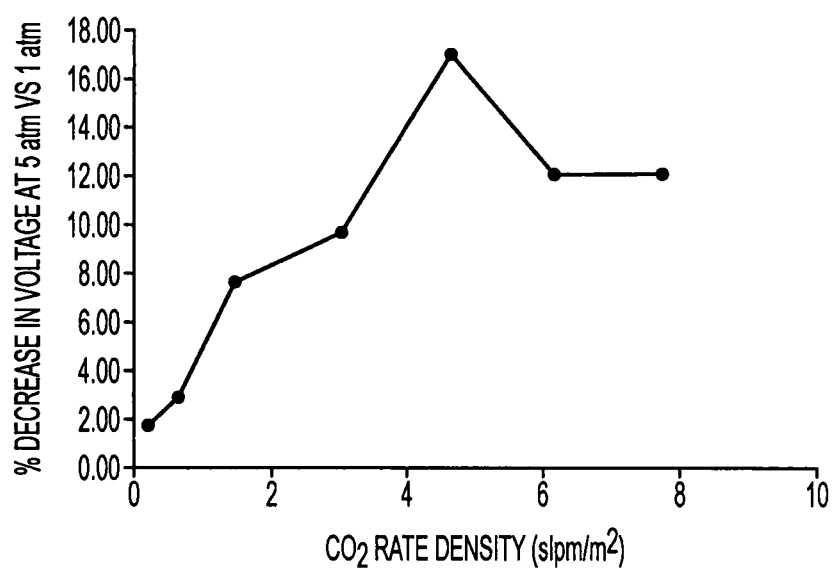
FIG. 8 shows the percent decrease in the measured total voltage of an embodiment of a high-pressure electrodialysis system operating at 5 atm compared to the voltage of an embodiment of a high-pressure electrodialysis system operating at 1 atm, plotted as a function of $CO_2$ rate density, when 0.5 M $K_2CO_3$ is flowed through the system.
Figure 9A:
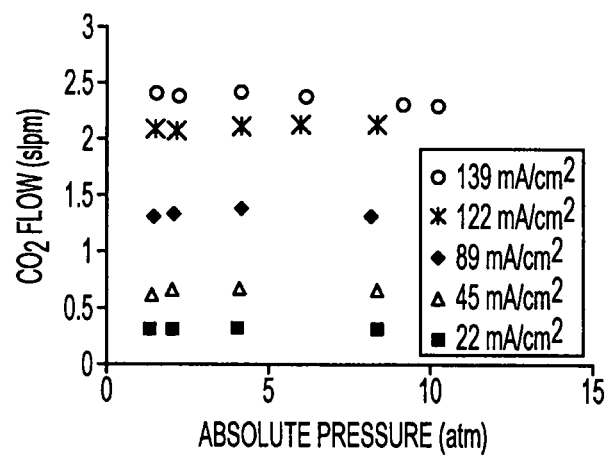
FIG. 9 shows measured values of experiments designed to characterize the performance of an embodiment of a high-pressure electrodialysis apparatus at currents of 4 A, 8 A, 16 A, 22 A, and 25 A for a 0.5 M $KHCO_3$ solution.
Figure 9B:
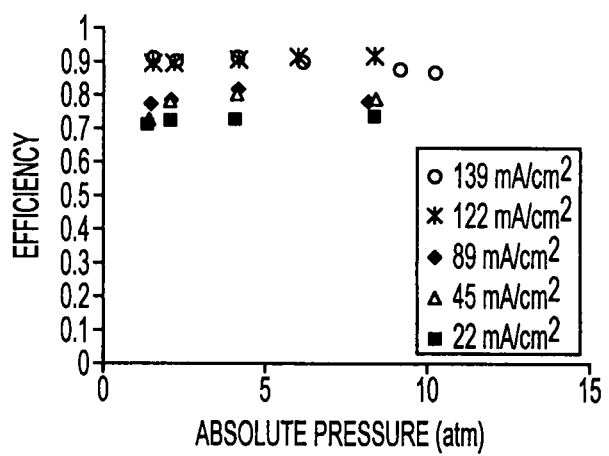
Figure 9C:
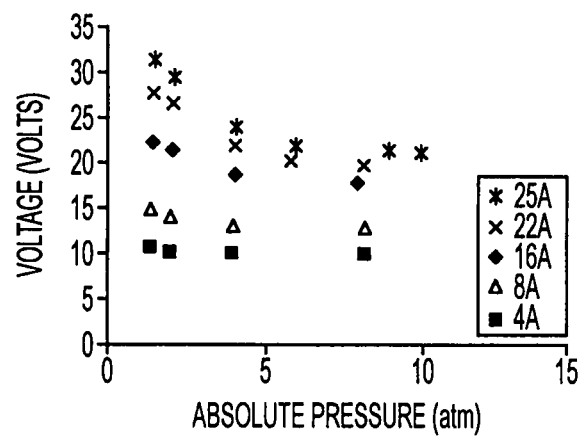
Figure 9D:
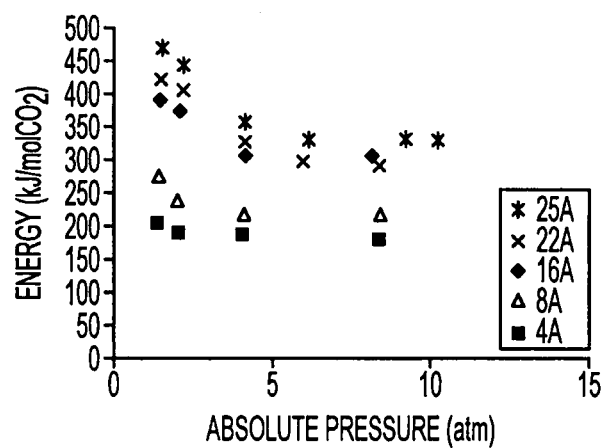

FIG. 7D shows that the significant reduction of voltage at 5 atm dominates the slightly reduced efficiency at 5 atm, resulting in a reduction in energy per molCO$_2$ at 5 atm compared to 1 atm of about 10% at current densities greater than 70 mA/cm$^2$.

Performance Characteristics of a High-Pressure Electrodialysis System

When a high-pressure electrodialysis system, such as the embodiment shown in FIG. 2, is used to evolve $CO_2$ gas from aqueous carbonate/bicarbonate solutions, several performance characteristics are seen: 1) $CO_2$ flow increases with increased current density; 2) voltage decreases with increased pressure for a given current density and base solution; 3) the magnitude of the voltage decrease is increased with increased current density; and 4) the required energy per mol of $CO_2$ decreases with increased pressure for a set current density and $CO_2$ transport rate. These performance characteristics occur because of suppression of gas bubble evolution in the electrodialysis stack as a result of performing high-pressure electrodialysis. These characteristics will be understood better by turning to the following tables and figures.

Tables 2-6 show measured values of $CO_2$ flow (slpm) (Table 2), efficiency (Table 3), voltage (Volts) (Table 4), fractional voltage reduction (Table 5), and energy (kJ/molCO$_2$) (Table 6) for experiments run to characterize the performance of a high-pressure electrodialysis apparatus, such as the embodiment shown in FIG. 2, at absolute pressures from 1.5 atm to 10 atm. These experiments were all performed under the following conditions: the BPMs, AEMs, and CEMs used were Neosepta BP-1E, Neosepta AHA, Neosepta C66-10F, respectively; base solutions of $KHCO_3$ were 0.5 M with pH of approximately 8.6; base solutions of $K_2CO_3$ were 0.5 M with pH of approximately 11.6; base solutions of KOH were 0.5 M with pH of approximately 13.6; all electrode solutions were 2 M KOH; all acid solutions were 0.3 M $KH_2PO_4$ and 30 mL of $H_3PO_4$ per 5 L of DI water with pH of approximately 2.6. The volumetric flow rate velocities through the embodiment seven-cell high-pressure electrodialysis unit (see FIG. 2) were 2.33 lpm for the acid and base solutions and 6.9 lpm for the electrode solution.

The following base solution/pressure combinations were investigated: 0.5 M $KHCO_3$ at 1.5 atm, 5 atm, and 10 atm; 0.5 M $K_2CO_3$ at 1.5 atm and 5 atm; and 0.5M KOH at 1.5 atm, 5 atm, and 10 atm.

Table 2 shows the measured rates at which $CO_2$ gas evolves from the acid tank after depressurization to 1 atm from absolute pressures of 1.5 atm, 5 atm, and 10 atm at increasing current densities. The $CO_2$ flow increases linearly with increasing current density, with the flow at a given current density being a factor of two higher for $KHCO_3$ than $K_2CO_3$.

TABLE 2

Rate of $CO_2$ Gas Evolution.

| $CO_2$ Flow (slpm) | | 5.6 | 11.1 | 22.3 | 44.5 | 66.8 | 89.0 | 111.3 |
|---|---|---|---|---|---|---|---|---|
| | | \multicolumn{7}{c}{Current Density (mA/cm$^2$)} |
| $KHCO_3$ | 1.5 atm | 0.05 | 0.12 | 0.32 | 0.69 | 1.08 | 1.40 | |
| | 5 atm | 0.04 | 0.11 | 0.31 | 0.69 | 1.07 | 1.42 | |
| | 10 atm | 0.04 | 0.12 | 0.35 | 0.73 | 1.11 | 1.42 | |
| $K_2CO_3$ | 1.5 atm | 0.02 | 0.08 | 0.18 | 0.38 | 0.58 | 0.77 | 0.97 |
| | 5 atm | 0.01 | 0.07 | 0.17 | 0.36 | 0.54 | 0.77 | 0.92 |

Table 3 shows the efficiency for absolute pressures of 1.5 atm, 5 atm, and 10 atm at increasing current densities. The efficiency is defined as the ratio of molecules of gas evolved per electron charge of current. Under this definition, the maximum possible efficiency for $KHCO_3$ is 1.0, and for $K_2CO_3$ is 0.5. No data for base solutions of KOH was collected because the $CO_2$ flow is zero when KOH is used as the base solution. Table 3 shows that the efficiency does not depend on pressure. Further, as the current density is increased, the efficiency reaches an asymptotic value of about 0.45 for $K_2CO_3$ and 0.85 for $KHCO_3$.

TABLE 3

Efficiency.

| Efficiency | | 5.6 | 11.1 | 22.3 | 44.5 | 66.8 | 89.0 | 111.3 |
|---|---|---|---|---|---|---|---|---|
| | | \multicolumn{7}{c}{Current Density (mA/cm$^2$)} |
| $KHCO_3$ | 1.5 atm | 0.46 | 0.58 | 0.77 | 0.82 | 0.86 | 0.84 | |
| | 5 atm | 0.40 | 0.54 | 0.75 | 0.82 | 0.85 | 0.85 | |
| | 10 atm | 0.39 | 0.58 | 0.83 | 0.87 | 0.88 | 0.85 | |
| $K_2CO_3$ | 1.5 atm | 0.24 | 0.38 | 0.43 | 0.45 | 0.46 | 0.46 | 0.46 |
| | 5 atm | 0.08 | 0.32 | 0.40 | 0.43 | 0.43 | 0.46 | 0.44 |

Table 4 shows the measured voltage for absolute pressures of 1.5 atm, 5 atm, and 10 atm at increasing current densities. Table 4 shows that 1) for a given current density and base solution, the total voltage across the electrodialysis stack decreases with increasing absolute pressure; and 2) the magnitude of this decrease is larger for base solutions of $K_2CO_3$ and $KHCO_3$ than it is for KOH. Table 5 shows the fractional voltage reduction at pressure p relative to the voltage measured at 1.5 atm, determined by the formula $(V_{1.5atm}-V_p)/V_{1.5atm}$. Table 5 shows that 1) while the fractional reduction for $K_2CO_3$ and $KHCO_3$ is about 20% and 15% respectively at high current densities, the reduction for KOH is at most 5%; and 2) the fractional voltage reduction increases with increasing current density. Both of these observations can be explained by the fact that the effect of increasing the absolute pressure of the electrodialysis system is to decrease the amount of $CO_2$ gas that evolves out of solution inside the electrodialysis stack.

TABLE 4

Voltage.

| Voltage (Volts) | | 5.6 | 11.1 | 22.3 | 44.5 | 66.8 | 89.0 | 111.3 |
|---|---|---|---|---|---|---|---|---|
| | | \multicolumn{7}{c}{Current Density (mA/cm$^2$)} |
| $KHCO_3$ | 1.5 atm | 7.27 | 8.86 | 11.43 | 15.60 | 20.50 | 23.28 | |
| | 5 atm | 7.17 | 8.46 | 10.24 | 13.46 | 16.72 | 19.39 | |
| | 10 atm | 7.11 | 8.34 | 10.27 | 13.29 | 15.52 | 19.24 | |
| $K_2CO_3$ | 1.5 atm | 7.20 | 8.24 | 10.25 | 13.17 | 17.31 | 19.11 | 21.50 |
| | 5 atm | 7.07 | 8.00 | 9.47 | 11.89 | 14.36 | 16.81 | 18.90 |
| KOH | 1.5 atm | 7.19 | 7.99 | 9.65 | 11.60 | 15.04 | 15.97 | 17.47 |
| | 5 atm | 7.08 | 7.89 | 9.62 | 11.28 | 13.73 | 15.24 | 16.95 |
| | 10 atm | 7.19 | 7.95 | 9.12 | 11.28 | 13.40 | 15.28 | 16.53 |

TABLE 5

Fractional Voltage Reduction.

| Fractional Voltage Reduction | | 5.6 | 11.1 | 22.3 | 44.5 | 66.8 | 89.0 | 111.3 |
|---|---|---|---|---|---|---|---|---|
| | | \multicolumn{7}{c}{Current Density (mA/cm$^2$)} |
| $KHCO_3$ | 5 atm | 0.01 | 0.04 | 0.10 | 0.14 | 0.18 | 0.17 | |
| | 10 atm | 0.02 | 0.06 | 0.10 | 0.15 | 0.24 | 0.17 | |
| $K_2CO3$ | 5 atm | 0.02 | 0.03 | 0.08 | 0.10 | 0.17 | 0.12 | 0.12 |
| KOH | 5 atm | 0.02 | 0.01 | 0.00 | 0.03 | 0.09 | 0.05 | 0.03 |
| | 10 atm | 0.00 | 0.00 | 0.05 | 0.03 | 0.11 | 0.04 | 0.05 |

For a fixed current density and efficiency, a certain quantity of $CO_2$ will be transported across the membrane and into the acid solution in the form of $HCO_3^-$ and $CO_3^{(2-)}$ ions. The pH of the acid solution determines the ratio of the concentrations of $CO_3^{(2-)}$, $HCO_3^-$, and $CO_2$ gas dissolved in solution, while the partial pressure of $CO_2$ gas in equilibrium with the acid solution determines the absolute value of the concentration of $CO_2$ dissolved in solution. The gas in equilibrium with the acid solution inside the electrodialysis system is pure $CO_2$ in steady state, so the partial pressure of $CO_2$ in equilibrium with the acid solution is the absolute pressure of the acid compartment. Given that at a fixed current density a fixed amount of $CO_2$ is transported into the acid solution, as the pressure is increased for a fixed current density, an increasing fraction of the $CO_2$ transported across the AEM into the acid solution will remain dissolved in solution as dissolved $CO_2$, $HCO_3^-$, and $CO_3^{(2-)}$, with the concentration ratios of these species determined by the acid solution pH. For each $CO_2$ transport rate, i.e., for each current density at some efficiency, there exists a pressure where all the transported $CO_2$ will remain in solution; increasing the pressure above this point should have no additional effect.

It is known that gas evolution inside the electrodialysis stack itself results in gas bubbles trapped on the membrane surface. This reduces the effective surface area of the membrane, resulting in increased current density and resistance and localized regions of very high current density, or "current crowding," that can result in membrane damage. In an embodiment high-pressure electrodialysis system, for a given current density and therefore a given rate of $CO_2$ transport, increasing the pressure reduces the total voltage across the stack via reduction of the resistance by reducing the volume of gas bubbles that comes out of solution inside the electrodialysis stack itself. The $CO_2$ instead comes out of solution when the acid solution is depressurized to approximately 1 atm or to some pressure between the ambient pressure and the pressure of the electrodialysis apparatus, and in the acid tank that is physically separated from the electrodialysis stack. The fractional reduction is greater for $KHCO_3$ than for $K_2CO_3$ at a given current density because the $CO_2$ transport rate for $KHCO_3$ is higher than that for $K_2CO_3$ at a given current density. Similarly, the reduction for $KHCO_3$ and $K_2CO_3$ is much larger than for KOH because no $CO_2$ evolution occurs for KOH; the small reduction observed for KOH is likely due to increased chemical activity at the electrodes due to the increased absolute pressure.

Finally, the fact that increased pressure reduces the voltage required for a fixed rate of $CO_2$ generation results in the data shown in Table 6, which shows the energy per mol $CO_2$ 1.5 atm, 5 atm, and 10 atm at increasing current densities. At a fixed current density and $CO_2$ transport rate, the required energy per mol of $CO_2$ is reduced with increasing pressure due to the suppression of gas bubble evolution inside the electrodialysis stack.

TABLE 6

Energy.

| Energy (kJ/molCO$_2$) | | Current Density (mA/cm$^2$) | | | | | |
|---|---|---|---|---|---|---|---|
| | | 5.6 | 11.1 | 22.3 | 44.5 | 66.8 | 89.0 | 111.3 |
| KHCO$_3$ | 1.5 atm | 223.15 | 211.22 | 205.75 | 261.72 | 329.20 | 383.71 | |
| | 5 atm | 247.89 | 215.32 | 189.20 | 225.35 | 271.89 | 315.50 | |
| | 10 atm | 250.65 | 196.76 | 170.81 | 211.17 | 243.89 | 311.54 | |
| K$_2$CO$_3$ | 1.5 atm | 422.69 | 302.33 | 326.78 | 402.11 | 514.01 | 571.58 | 639.72 |
| | 5 atm | 1406.77 | 350.38 | 327.24 | 383.46 | 458.94 | 508.75 | 592.61 |

FIG. 9A-9D shows measured values of $CO_2$ flow (slpm) (FIG. 9A), efficiency (FIG. 9B), voltage (Volts) (FIG. 9C), and energy (kJ/molCO$_2$) (FIG. 9D) for experiments characterizing the performance of a high-pressure electrodialysis apparatus, such as the embodiment shown in FIG. 2, at currents of 4 A, 8 A, 16 A, 22 A, and 25 A. Each experimental run was performed at a constant current density, with the pressure being increased until the asymptotic value of voltage was reached. Although 25 A was the highest current allowed by the embodiment experimental setup, it will be appreciated that higher currents may be possible with other embodiments. The membrane area for each membrane in this experiment was approximately 180 cm$^2$, meaning that 25 A corresponds to a current density of 139 mA/cm$^2$. The following conditions were used: the BPMs, AEMs, and CEMs used were Neosepta BP-1E, Neosepta AHA, and Neosepta C66-10F, respectively; base solutions of KHCO$_3$ were 0.5 M with pH of approximately 8.6; all electrode solutions were 2M KOH; all acid solutions were 0.3 M KH$_2$PO$_4$ and 30 mL of H$_3$PO$_4$ per 5 L of DI water with pH of approximately 2.6. The volumetric flow rates through the high-pressure electrodialysis unit were 2.33 lpm for the acid and base solutions and 6.9 lpm for the electrode solution. The experiments investigated base solutions of 0.5M KHCO$_3$ at pressures from 1.5 atm to 10.2 atm.

FIG. 10A shows a plot of the measured rate at which $CO_2$ gas evolves from the acid tank after depressurization to 1 atm versus absolute pressure (atm). FIG. 10B shows a plot of the efficiency versus absolute pressure for the same data points. The efficiency is defined as the ratio of molecules of gas evolved per electron charge of current. FIG. 10A shows that the $CO_2$ flow is greater at all pressures as the current density increases, an approximately linear increase. FIG. 10B shows that a slightly higher than linear increase in $CO_2$ flow at high current densities results from a slightly increasing efficiency with increasing current density.

FIG. 10C shows a plot of the measured voltage versus absolute pressure for five different values of total current: 4 A, 8 A, 16 A, 22 A, and 25 A. FIG. 10C shows that 1) for a given current density and base solution, the total voltage across the electrodialysis stack decreases with increasing absolute pressure; 2) the magnitude of this decrease is larger for higher current densities; and 3) for a fixed current density, the voltage asymptotically approaches a minimum voltage with increasing pressure. The asymptotic behavior of the voltage with increasing pressure is because for each $CO_2$ transport rate, i.e., for each current density at some efficiency, there is a pressure where all the transported $CO_2$ will remain in solution; increasing the pressure above this point should have no additional effect.

FIG. 10C also shows that for a given current density, and therefore a given rate of $CO_2$ transport, increasing the pressure reduces the total voltage across the stack via reduction of the resistance by reducing the volume of gas bubbles that come out of solution inside the membrane stack itself. The $CO_2$ instead comes out of solution when the acid solution is depressurized to 1 atm in the acid tank that is physically separated from the membrane stack. The reduction increases for increasing current density because the $CO_2$ transport rate increases with current density. The reduction reaches an asymptotic limit as the pressure is increased because above some pressure, all the $CO_2$ remains dissolved in solution.

FIG. 10D shows a plot of the energy per molCO$_2$ versus pressure for five values of current density. In an embodiment, the membrane area of the membranes in an apparatus is approximately 180 cm$^2$, so a current of 25 A corresponds to a current density of approximately 140 mA/cm$^2$. FIG. 10D shows that increased pressure reduces the voltage required for a fixed rate of $CO_2$ generation. At a fixed current density and $CO_2$ transport rate, the required energy per mol of $CO_2$ is reduced as the pressure is increased due to the suppression of gas bubble evolution inside the electrodialysis stack. For 25 A, the energy required at 10.2 atm, or 333 kJ/molCO$_2$, is about 30% less than the energy required at 1.5 atm, or 471 kJ/molCO$_2$. Thus, as the current density and therefore the $CO_2$ generation rate is increased, increasing pressure results in a larger and larger fractional reduction of the energy consumption compared to operation at 1 atm.

Conditions for Maximizing the Performance of a High-Pressure Electrodialysis System A high-pressure electrodialysis system allows for energy-efficient, high-rate concentration of gas, for example, $CO_2$, in a compact, reliable unit. In the case of $CO_2$, this can be done, for example, by performing high-pressure BPMED on aqueous carbonate/bicarbonate capture solutions using a high-pressure BPMED system, such as the embodiment shown in FIG. 2. This allows for the evolution of pure $CO_2$ from the capture solutions at pressures greater than or equal to ambient pressure and less than the pressure of the electrodialysis apparatus; such $CO_2$ is suitable, for example, for reaction to liquid fuel, sequestration, or incorporation into other materials like cement. Further, in an embodiment, a high-pressure electrodialysis system includes active pH control ($pH_{base} - pH_{acid} \leq 7$) for energy efficient $CO_2$ separation, and high current densities (≥100 mA/cm²) in a gas-evolving system enabled by the high-pressure operation. This combination of high-pressure operation with pH control and high current densities allows energy efficient, high-rate $CO_2$ separation in a compact, reliable unit.

In an embodiment, a high-pressure electrodialysis system allows for the energy consumed per mol of $CO_2$ generated for a given flow rate to be minimized. For example, if a certain volumetric flow rate of $CO_2$ is desired, the energy consumed per mol of $CO_2$ regenerated can be minimized by 1) using a base solution where all the $CO_2$ is contained in the form of bicarbonate ($HCO_3^-$) ions, for example, $KHCO_3$; 2) using a base solution where the concentration of $HCO_3^-$ ions is 0.5M; 3) operating at an electrodialysis stack pressure of at least 10 atm absolute pressure; and 4) setting the current density applied across the membrane stack to match the desired $CO_2$ volumetric flow rate.

In an embodiment, a high-pressure electrodialysis system also allows for the voltage to be minimized given a fixed current density. For example, for a fixed current density and other fixed parameters such as solution concentrations and flow rates, the voltage can be minimized by operating at a sufficiently large electrodialysis stack pressure. For a given set of parameters, as the absolute pressure of the electrodialysis stack is increased above 1 atm, the voltage decreases, until at some threshold voltage any additional pressure increases no longer affect the voltage. The value of this threshold voltage will depend on the values of the other process conditions, and is directly related to the volumetric rate of $CO_2$ gas regeneration.

In an embodiment, where the operating pressure and temperature result in gaseous $CO_2$ dissolved in solution after the electrodialytic ion transfer, the $CO_2$ regeneration is performed by a gas/liquid separation of the $CO_2$ from the solvent. In the case where the operating pressure and temperature result in a solution/liquid $CO_2$ or solution/supercritical $CO_2$ mixture after the electrodialytic ion transfer, the $CO_2$ regeneration is performed by high-pressure electrodialysis followed by a liquid/liquid or liquid/supercritical fluid separation of the $CO_2$ from the solvent.

In an embodiment, solutions that evolve gases other than $CO_2$ may be used. For example, $SO_2$ gas can be produced when aqueous sulfite or bisulfate solutions are input into the system and made more acidic via operation of the system; and $NH_3$ gas can be produced when aqueous ammonium solutions are input into the system and made more basic via operation of the system.

In some embodiments, a gas is absorbed into an aqueous solution at some pressure Plow. High-pressure electrodialysis is then performed on the solution, and then the same gas is regenerated at a pressure $p_{high}$ with $p_{high} > p_{low}$. In this way, the embodiments may be used as a novel gas pressurization process capable of replacing inefficient mechanical compressors.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A process for producing a gas using an electrodialysis apparatus comprising:

flowing at least a first solution, and a second solution into the electrodialysis apparatus, the electrodedialysis apparatus comprising two axial support members sealingly coupled to define a housing enclosing an electrodialysis stack;

flowing an electrode solution into the electrodialysis apparatus;

pressurizing the electrodialysis apparatus at a stack pressure;

applying a voltage to the electrodialysis stack of the electrodialysis apparatus such that a dissolved gas is generated in the second solution;

flowing the second solution out of the electrodialysis apparatus;

regenerating the gas out of the second solution; and collecting the gas.

2. The process of claim 1 wherein the stack pressure is greater than an ambient pressure.

3. The process of claim 2 wherein the regenerating is achieved by depressurizing the second solution to a solution pressure that is less than the stack pressure such that a portion of the dissolved gas evolves out of the second solution.

4. The process of claim 3 wherein the solution pressure is greater than an ambient pressure such that the dissolved gas evolves out of the second solution at a gas pressure that is less than the stack pressure and greater than the ambient pressure.

5. The process of claim 2 wherein the stack pressure is approximately 200 atm or less.

6. The process of claim 1 wherein the third solution comprises a salt solution.

7. The process of claim 1 wherein the second solution comprises any one or more of a phosphoric acid, a hydrogen phosphate, and a dihydrogen phosphate.

8. The process of claim 7 wherein the first solution has a concentration of approximately 0.05 M to 2 M.

9. The process of claim 1 wherein the first solution comprises any one or more of a carbonate, a bicarbonate, a hydroxide, and a monoethanolamine.

10. The process of claim 9 wherein the first solution comprises any one or more of a $KHCO_3$, a $K_2CO_3$, a $NaHCO_3$, and a $Na_2CO_3$.

11. The process of claim 9 wherein the second solution has a concentration of 0.05 M to 2 M.

12. The process of claim 1 wherein the electrode solution comprises a hydroxide.

13. The process of claim 12 wherein the hydroxide comprises the same cation as a cation of the at least first and second solutions.

14. The process of claim 12 wherein the electrode solution has a concentration of approximately 0.1 M to 2 M.

15. The process of claim 1 wherein the gas comprises any one or more of a $CO_2$, a $SO_2$, and an $NH_3$.

16. The process of claim 1 wherein the at least first and second solutions are flowed into the electrodialysis apparatus at a flow velocity of approximately 60 to 300 liters per hour.

17. The process of claim 1 wherein the electrode solution is flowed into the electrodialysis apparatus at a flow velocity of approximately 200 to 600 liters per hour.

18. The process of claim 1 wherein the voltage is selected such that a current density is 10 to 150 mA/cm².

19. The process of claim 1 wherein the at least first and second solutions are held at an approximately constant pH.

20. The process of claim 1, wherein the flowing at least a first solution and a second solution comprises flowing the first solution, the second solution, and a third solution into the electrodialysis apparatus.

21. A process for generating a product from an input solution using an electrodialysis apparatus comprising:

flowing at least a first solution and a second solution into the electrodialysis apparatus, the electrodedialysis apparatus comprising two axial support members sealingly coupled to define a housing enclosing an electrodialysis stack;

flowing an electrode solution into the electrodialysis apparatus;

adjusting a temperature and a pressure of the electrodialysis apparatus, the temperature and pressure selected such that the product will be generated from the second solution;

applying a voltage to the electrodialysis stack of the electrodialysis apparatus such that the product is generated in the second solution;

flowing the second solution out of the electrodialysis apparatus; and regenerating the product from the second solution.

22. The process of claim 21, wherein the temperature and the pressure are selected such that the product comprises one or more of a gas, a liquid, and a supercritical fluid.

23. The process of claim 22, wherein the product comprises a $CO_2$ liquid.

24. The process of claim 22, wherein the product comprises supercritical $CO_2$.

* * * * *